3,129,645
ELECTRICALLY MODULATED FLUID VALVE
Peter B. Olmsted, Ann Arbor, Mich., assignor to Double
A Products Co., Manchester, Mich., a corporation of
Michigan
Filed May 2, 1962, Ser. No. 191,768
6 Claims. (Cl. 91—461)

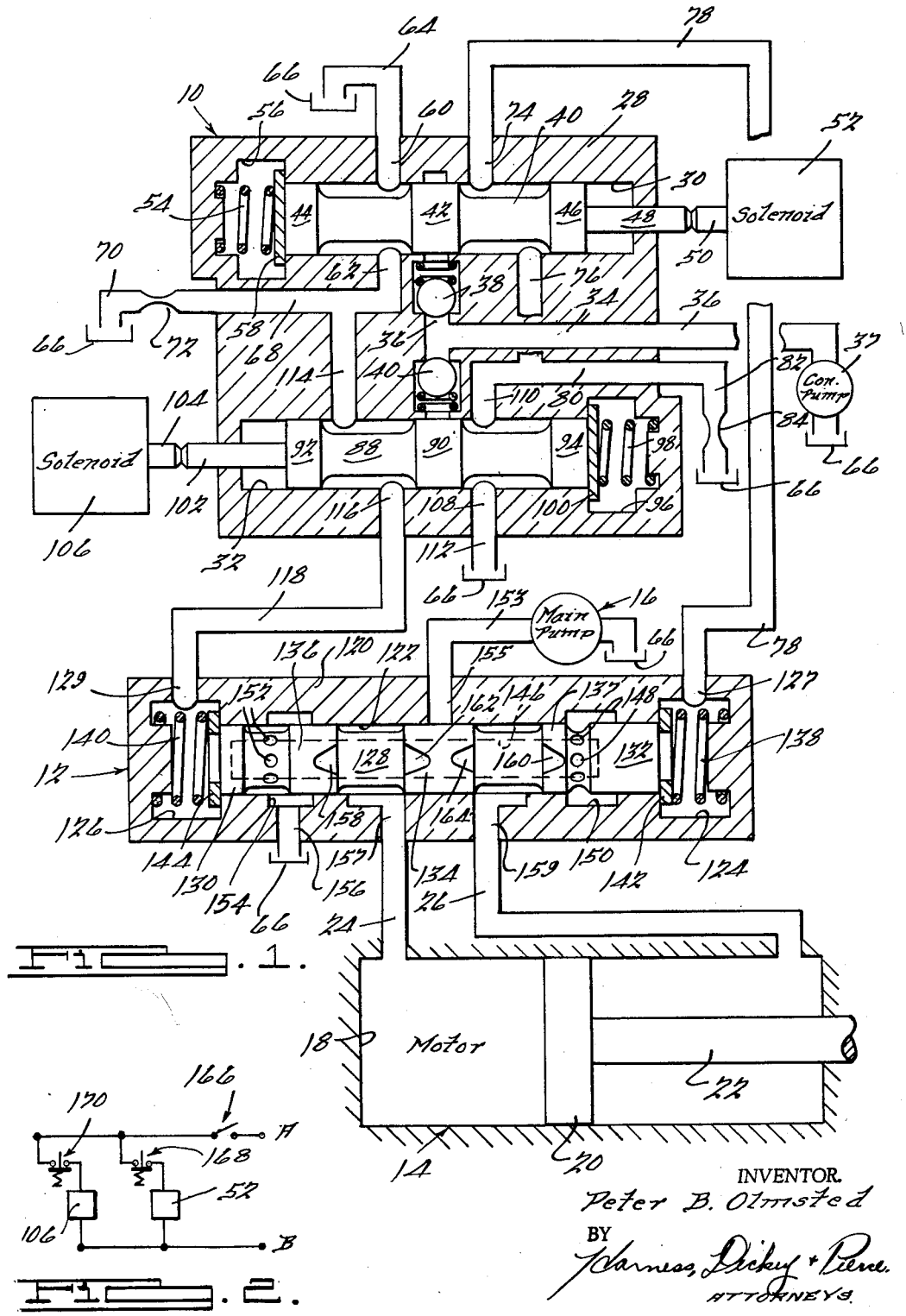

This invention relates generally to remote-controlled valves, and more particularly to unique means for electrically remote controlling a four-way valve having provision for substantial throttling.

It is a primary object of the present invention to provide novel valve means which is relatively simple in construction, easy to operate, and which may be controlled from a remote location to in turn control the output of a fluid motor.

Another object resides in the provision of a unique remotely controlled pilot valve section in combination with a pilot-operated valve section which is capable of throttling the fluid flow therethrough. A related object concerns the provision of such a valve, wherein the pilot-operated valve is a four-way valve having provision for substantial throttling, whereby both the direction and speed of a fluid motor may be remotely controlled.

Yet a further object of the present invention lies in the provision of a remotely-operated valve of the afore-described type which has flexibility in its application and which may be electrically controlled by only two single-acting solenoids and as few as two switches, yet which may alternatively be manually or mechanically controlled if desired.

These and other objects of the present invention will become apparent from a consideration of the specification taken in conjunction with the accompanying drawings in which there is illustrated an embodiment of the present invention, and wherein:

FIGURE 1 is a diagrammatic view illustrating an electrically modulated fluid valve incorporating the principles of the present invention; and FIGURE 2 is a schematic wiring diagram illustrating one exemplary circuit for controlling the valve.

Referring to the drawings the invention is seen to comprise a unique solenoid operated pilot valve section 10 for controlling the operation of a four-way valve section 12, which in turn controls the direction and magnitude of flow of fluid to a fluid motor 14 to vary the speed and direction of the latter, the power portion of the system being supplied with fluid by means of a suitable main pump 16. As will be appreciated, the fluid motor may be of any desired type; however, for exemplary purposes it is illustrated as a piston and cylinder unit including a housing having a cylinder bore 18, a piston 20 slidably disposed therein, and a connecting rod 22 connected to the latter and extending through one end of the housing defining cylinder bore 18. Fluid supply and return lines 24 and 26 serve to place the four-way valve in fluid communication with opposite ends of the cylinder bore 18.

Considering in detail solenoid operated pilot valve 10, it will be seen that the latter comprises a housing 28 having two primary valve chambers or bores 30 and 32 therein, disposed generally parallel to one another on opposite sides of the housing. Intermediate the valve bores housing 10 is provided with a passageway 34 communicating with a fluid line 36 which extends from a control pump 37 for communicating fluid under a substantially constant control pressure to the pilot valve. Both pump 16 and 37 may be of any suitable type and are illustrated diagrammatically as including all necessary pressure relief circuitry. Extending between the valve bores is another passageway 36 communicating with passageway 34 for supplying fluid from the latter to both of the valve bores. However, in order to limit the direction of flow there are provided in passageway 36 a check valve 38 between passageway 34 and valve bore 30, and a check valve 40 between passageway 34 and valve bore 32, both of the check valves being of conventional construction. Thus, as can be seen, fluid may flow from passageway 34 into either or both of the valve bores, but it canot flow in the opposite direction.

Slidably disposed within valve bore 30 is a valve spool 40 having a central land 42 and end lands 44 and 46. At one end spool 40 is provided with a projection 48 which extends outside housing 10 and into an abutting relationship with a portion 50 of the armature of a suitable single acting solenoid 52, which may be of the usual type. Spool 40 is shown in its centered or at-rest position, i.e., the position which it will assume when the solenoid is deenergized. It is maintained in this position by the provision of a suitable compression spring 54 positioned within a spring-receiving chamber 56 at one end of the valve bore and acting between the end of the housing and a retainer member 58 to urge the spool in the right-hand direction, as illustrated, against the solenoid. Member 58 is larger than bore 30 so that spring 54 will not cause the spool to move past its centered or at-rest position. Energization of solenoid 52 will cause the spool to move to the left to an operating position, and upon subsequent de-energization spring 54 will act as a return spring to return the spool to its at-rest position. To account for normal leakage chamber 56 and the portion of bore 30 through which projection 48 extends should be vented to drain or tank in the usual manner.

Communicating with valve bore 30, in an area between lands 44 and 42 of spool 40 are passageways 60 and 62. Passageway 60 communicates with a fluid line 64 which extends to the tank or reservoir of the system, indicated generally throughout the drawings at 66. Passageway 62 communicates with another passageway 68 which in turn communicates with a fluid line 70 extending to tank 66. For reasons that will become apparent later, line 70 is provided with a restriction 72 for restricting the flow of fluid from passageway 68 to tank.

In the area between lands 42 and 46 valve bore 30 is provided with passageways 74 and 76, the latter being positioned closer to land 46 and the former being positioned closer to land 42 when the spool is in its centered position. Passageway 74 communicates with a fluid line 78 which extends to the four-way valve. Passageway 76 communicates with a passageway 80, the latter in turn communicating with a fluid line 82 extending to tank 66. As can be seen fluid line 82 is also provided with a restriction 84 in the same manner and for the same reason as is fluid line 70.

As can be seen, when spool 40 is in its centered (illustrated) position passageways 60 and 62 communicate with each other, passageways 74 and 76 communicate with each other, and land 42 prevents the flow from passageways 34 and 36 into the valve bore. However, when the solenoid is energized and the spool is moved to its leftmost position from the position illustrated, land 42 blocks passageways 60 and 62, land 46 blocks passageway 76, and fluid is allowed to flow from passageways 34 and 36 through check valve 38 into the valve bore 30 and from there into passageway 74 and fluid line 78 to the four-way valve.

The circuitry associated with valve bore 32 is generally similar to that associated with valve bore 30. Thus, slidably disposed within valve bore 32 is a spool 88 having a central land 90 and end lands 92 and 94. At one end of the valve bore there is provided a spring-receiving chamber 96 in which is disposed a compression spring 98 which acts between the housing and a retainer member 100 for urging spool 88 to the left, but not past its centered (illustrated) position. At the opposite end of the spool there is provided a projection 102 which abuts a portion 104 of the armature of a single acting solenoid 106 which may be similar in construction to solenoid 52. When the solenoid is energized the spool moves from its illustrated centered position to the right and when the solenoid is then deenergized compression or return spring 98 returns the spool to its centered position. To account for normal leakage chamber 96 and the opposite end of bore 32 should be vented to drain or tank.

Communicating with valve bore 32 in an area between lands 90 and 94 are passageways 108 and 110, the latter communicating with passageway 80 and the former communicating with a fluid line 112 which extends to tank 66. Communicating with valve bore 32 in the area between lands 92 and 90 is a passageway 114 communicating with passageway 68, and a passageway 116 communicating with a fluid line 118 which extends to the four-way valve.

It can thus be seen, when spool 88 is in its centered (illustrated) position passageway 114 communicates with passageway 116, passageway 110 communicates with passageway 108, and land 90 prevents the flow of fluid from passageways 34 and 36 into the valve bore. However, when the solenoid is energized and the spool moves to the right, from the position illustrated, land 92 blocks passageway 114, land 90 blocks passageways 110 and 108, and fluid is allowed to flow from passageways 34 and 36 through check valve 40 into the bore 32, from whence it flows to passageway 116 and fluid line 118 to the four-way valve.

Four-way valve 12 comprises a housing 120 having a valve chamber or bore 122 therein, one end of which communicates with a spring-receiving and pressure chamber 124 and the other end of which communicates with a spring-receiving and pressure chamber 126. Fluid under control pressure is communicated from the pilot valve section to chamber 124 by means of a passageway 127 connected to line 78 and to chamber 126 by means of a passageway 129 connected to line 118. Slidably disposed within bore 122 is a valve element or spool 128 having end lands 130 and 132, a central land 134, and additional lands 136 and 137. Element or spool 128 is illustrated in its centered at-rest position, and in the absence of fluid pressure in chambers 124 and 126 is maintained in this position by means of compression centering springs 138 and 140 disposed within chambers 124 and 126 respectively. Spring 138 acts between the housing and a retainer member 142 to urge the spool towards the left, as viewed, but not past its centered position, and spring 140 acts between the opposite end of the housing and a retainer member 144 to urge the spool to the right, but not past its centered position. Accordingly, when the spool is displaced from its centered position one of the centering springs will urge it back to its centered position, but when it is centered neither of the springs will exert a force directly on the spool because the retainer members are greater in diameter than the valve bore, as is clearly illustrated.

Valve element or spool 128 is provided with an internal passageway 146 which communicates at one end with the valve bore through a plurality of apertures 148 extending through the spool between lands 132 and 137. At this point valve bore 122 is slightly enlarged, as indicated at 150. The opposite end of internal passageway 146 communicates with the valve bore through a plurality of apertures 152 extending through the spool between lands 130 and 136. The valve bore is enlarged at this point, as indicated at 154, and communicates with a fluid line and passageway 156 extending to tank 66.

Fluid is communicated to the valve bore 122 from main pump 16 by means of fluid line 153 and a passage 155 in the housing. Fluid is supplied from the valve bore to fluid lines 24 and 26 by means of passageways 157 and 159, respectively, each of which is enlarged at its point of intersection with the valve bore, in the manner illustrated.

Since it is desired that the four-way valve be capable of throttling the flow of fluid to the motor controlled thereby, spool 128 is provided with a plurality of metering flats, the plane of each of which extends obliquely with respect to the axis of the spool. Thus, a plurality of flats 158 are provided on land 136 for metering in progressively increasing amounts the fluid passing from the valve bore between lands 136 and 134 into passageway 156 when the spool is moved progressively to the left. Similarly, land 137 is provided with a plurality of flats 160 for metering in progressively increasing amounts fluid flowing from the valve bore between lands 134 and 137 into enlarged portion or chamber 150 when the spool is moved progressively to the right. Land 134 is provided on one side with a plurality of flats 162 and on the other side with a plurality of flats 164 for metering fluid supplied from pump 16 in progressively increasing amounts into passageway 24 when the spool is moved progressively to the right and passageway 26 when the spool is moved progressively to the left.

Thus, as can be seen, when the valve spool is in its centered (illustrated) position, fluid line 24 is blocked by lands 136 and 134, fluid line 26 is blocked by lands 134 and 137, and land 134 blocks passageway 155. When spool 122 is gradually moved to the right, fluid from pump 16 will be throttled across flats 162 and into passageway 157 to urge piston 20 of the motor to the right. At the same time, return fluid from the opposite side of the piston will be allowed to flow across flats 160 into chamber 150 through apertures 148, passageway 146, apertures 152, enlarged valve bore 154 and passageway 156 to tank. As the displacement of the spool is increased to the right from center, the amount of fluid supplied to the motor through fluid line 24 will be increased, and vice versa. When the spool is moved gradually to the left from center, fluid is throttled from pump 16 across flats 164 to fluid line 26 to urge piston 20 to the left. Exhaust fluid will flow through fluid line 24 across flats 158 into enlarged valve bore 154 and passageway 156 to tank. The greater the displacement of the spool to the left from center, the greater will be the amount of fluid supplied to the motor through passageway 26, and vice versa.

The valve of the present invention is so constructed that there is a large degree of flexibility in the manner in which it may be operated to control a fluid motor, the particular mode of operation depending in part upon the manner in which the solenoids are wired. For exemplary purposes, two modes of control will be described.

One manner in which the solenoids may be wired is illustrated in FIGURE 2, wherein power is provided across terminals A and B and the two solenoids are wired in parallel. A main on-off switch 166 is provided for supplying power to both solenoids, a normally closed switch 168 is provided for deenergizing solenoid 52 when main switch 166 is closed, and a normally closed switch 170 is provided for deenergizing solenoid 106 when main switch 166 is closed. Considering the resultant mode of operation, when the system is in its at-rest position, with switch 166 open, the entire system will assume the position illustrated and piston 20 will be fluid locked in position. When it is desired to energize the system to control the speed and direction of displacement of piston 20, switch 166 may be closed to thereby simultaneously energize both solenoids 106 and 52. This will in turn cause spool 40 to move to its leftmost position and spool 88 to its rightmost position, whereupon fluid under control pressure will be supplied through passageways 78 and 118, respectively, to the chambers at opposite ends of spool 128 in the four-way valve. It will, therefore, remain in its centered position, fluid locked in place to thereby maintain the fluid-locked condition of the motor.

In the event it is desired to move piston 20 to the right, switch 168 may be opened to deenergize solenoid 52, whereupon spool 40 will return to its centered position and four-way valve chamber 124 will be communicated through passageways 78, 76, and 82 to tank. However, since a restriction 84 is provided in passageway 82, the exit of fluid from chamber 124 will be restricted so that the presence of fluid under control pressure in chamber 126 will cause spool 128 to move only slowly to the right. As the spool moves from its centered position, fluid from pump 16 will be supplied in progressively increasing amounts to the motor to move piston 20 to the right at a progressively increasing rate of speed. When the operator has observed that piston 20 is moving at the desired rate of speed, he need only remove his finger from switch 168, if it is of the push-button type, whereupon solenoid 52 will be re-energized to fluid lock the four-way valve spool in the position giving the desired flow to the motor. The motor will continue moving, but at a constant speed. If it is desired to stop the motor, the necessary centering of spool 128 may be quickly achieved by either opening switch 166 or both switches 168 and 170. If, on the other hand, it is desired only to decrease the rate of speed of the motor, the operator may open switch 170 which will cause chamber 126 to be placed in communication with tank through restriction 72, thus enabling spool 128 to be forced slowly to the left toward its centered position by the control pressure existing in chamber 124.

In the event it is desired to drive the motor in the opposite direction the operator may stop the motor in either of the above-described ways and then, after switches 166 and 168 are closed, open switch 170 to deenergize solenoid 106. This will place chamber 126 in communication with tank through restriction 72 so that the fluid under control pressure in chamber 124 will move spool 128 slowly to the left, to in turn progressively increase the amount of fluid supplied through line 26 to the motor to increase its rate of movement to the left. When the desired rate of displacement or speed has been achieved, the operator may allow switch 170 to close to fluid lock spool 128 in a position which will maintain the desired rate of flow to the motor. The motor will continue moving to the left, but at a constant speed. It may be quickly stopped by simply opening both switches 168 and 170, or by opening switch 166. Alternately, its rate of movement to the left may be decreased by opening switch 168 to place chamber 124 in communication with tank through restriction 84.

The fluid locking of spool 128 when both of the solenoids are energized is made possible by the provision of check valves 38 and 40, and it occurs even though spool 128 may be in a pressure balanced noncentered position in which one, but not the other, of the centering springs is urging it back to a centered position. Thus, if spool 128 is displaced to the left and both solenoids are energized, in the absence of the aforementioned check valves one might expect that since the pressure in chambers 126 and 124 is equal, spring 140 would cause spool 128 to return to its centered position. However, in the present system the escape of fluid from chamber 124 through fluid line 78, valve chamber 30 and passageway 36 is prevented by the provision of check valve 38 which allows fluid to flow into the chamber through passageway 36 but which prevents the escape of fluid from the chamber into passageway 36. The same principle of operation exists with respect to check valve 40 when spool 128 is in a right-hand displacement position and both solenoids are energized to maintain it in position for constant speed operation. The drifting caused by normal leakage has been found to be insignificant, especially in constant surveillance applications, for which the present invention is particularly well suited.

If at any time whatsoever during the control of the motor by the operator it is desired to quickly stop the motor and fluid lock it in position, the operator needs only to deenergize both solenoids, such as by opening switch 166. This will cause spool 128 to immediately return to its centered position by the action of springs 138 and 140, in which position the motor is fluid locked. The motor may also be fluid locked without using switch 166 by simply opening whichever of switches 170 or 168 will cause spool 128 to cross its centered position and then closing the switch as soon as the centered position is reached. In this case the motor will be fluid locked and yet solenoids 52 and 106 will remain energized.

A somewhat different mode of operation may be achieved by simply omitting switch 166 and substituting in lieu of switches 168 and 170, normally open switches. According to this mode of operation, therefore, when it is desired to drive the motor in a given direction one of the normally open switches will be closed to energize one of the solenoids. The energized solenoid will then cause fluid under control pressure to be supplied to one end of the four-way valve spool which in turn will cause fluid to be supplied to one end of the motor in increasing amounts. When the desired rate of motor speed is achieved it may be maintained by simply closing the other switch to fluid lock spool 128. Any subsequent deenergization of either solenoid will cause spool 128 to move to either reduce speed or increase it, or to move across the center position to various positions of operation in the opposite direction, as will be apparent based on an understanding of the first mode of operation.

Regardless of the specific manner in which the solenoids are wired (many other arrangements being readily apparent to one skilled in the art) the present valve operates in such a way that when neither solenoid is actuated the four-way valve is spring centered and the motor is fluid locked. When only one solenoid is energized, the chamber at one end of the four-way valve spool is supplied with fluid under control pressure and the chamber at the opposite end is placed in restricted communication with tank to accelerate the motor in one direction or decelerate it in the opposite direction. When only the other solenoid is energized the opposite chamber is supplied with fluid under control pressure and said one chamber is placed in restricted communication with tank to accelerate the motor in the opposite direction or decelerate it in said one direction, and when both solenoids are energized control pressure is supplied to both ends of the four-way valve spool to fluid lock it in place and thus maintain the motor at a constant speed or at zero speed if the spool is centered.

As will be appreciated, if desired, the pilot section 10 and the pilot-operated section 12 may be fabricated in the same housing. Alternately, if some advantage is to be thereby gained in a particular application, the entire pilot section may be located remotely from the pilot-operated section and motor. In addition, if desired, the solenoids may be eliminated and the spools in each of the valves constituting the pilot section may be controlled manually or mechanically by other means. In any case, it will be seen that the present valve is extremely flexible in the number of applications to which it may be readily adapted.

Thus, there is disclosed in the above description and in the drawings one exemplary embodiment of the present invention which fully and effectively accomplishes the objects thereof. However, it will be apparent that variations and details of construction may be indulged in without departing from the sphere of the invention herein described, or the scope of the appended claims.

What is claimed is:

1. Means for remotely controlling the direction and speed of a fluid motor, comprising: a pump adapted to supply fluid under pressure; a fluid reservoir; a four-way throttling valve operatively interconnecting said fluid motor, reservoir and pump and having a normally centered valve spool therein adapted to be selectively positioned to control the direction and speed of said fluid motor, said spool when centered adapted to prevent fluid from said pump from driving said motor; first pressure-responsive means for moving said spool in one direction; second pressure-responsive means for moving said spool in the opposite direction; means for supplying fluid under control pressure; first valve means for supplying fluid under control pressure to said first pressure-responsive means; second valve means for supplying fluid under control pressure to said second pressure-responsive means; said first and second valve means being arranged in such a way that when neither valve means is actuated said four-way valve is centered and fluid from said pump is prevented from driving said motor, when said first valve means is actuated said first pressure-responsive means is supplied with fluid under control pressure and said second pressure-responsive means is placed in restricted communication with said reservoir whereby said spool will be forced slowly in one direction to accelerate said motor in one direction or decelerate it in the opposite direction, when said second valve means is actuated said second pressure-responsive means is supplied with fluid under control pressure and said first pressure-responsive means is placed in restricted communication with said reservoir whereby said spool will be forced slowly in the opposite direction to accelerate said motor in the opposite direction or decelerate it in said one direction, and when both said valve means are actuated control pressure is supplied to both said pressure-responsive means to fluid lock said spool in place and thus maintain said motor at a constant speed or at zero speed if said spool is centered.

2. Apparatus as claimed in claim 1, wherein said first and second valve means are actuated by solenoids.

3. Means for remotely throttling a flow of fluid, comprising: a pump adapted to supply fluid under pressure; a fluid reservoir; throttling valve means communicating with said reservoir and pump, and including a housing having a valve bore therein, a discharge port communicating with said bore, a movable valve element in said bore, and a chamber in said housing at each end of said element adapted to receive fluid under control pressure to move said element back and forth between two positions, said valve being arranged so that when said element is in one of said positions said port is blocked and when said element is moved progressively toward said other position said port is placed in progressively increasing communication with said pump; means for supplying fluid under control pressure; a first pilot valve including a valve bore having a valve spool therein and means urging said spool to a first position; first actuating means for moving said spool from said first position to a second position; a second pilot valve including a valve bore having a valve spool therein and means urging said spool to a first position; second actuating means for moving said second valve spool from said first position to a second position; supply passageways for communicating fluid under control pressure to the bores of said first and second pilot valves; and check valves in said supply passageways for preventing flow through said supply passageways from said bores, said pilot valves being so arranged that when neither of said actuating means are actuated and said spools are in said first position each of said chambers communicates with said reservoir, when said first actuating means is actuated one of said chambers is supplied with fluid under control pressure and the other chamber is placed in restricted communication with said reservoir whereby said valve element will be forced slowly in one direction, when said second actuating means is actuated the other of said chambers is supplied with fluid under control pressure and said one chamber is placed in restricted communication with said reservoir whereby said valve element will be forced slowly in the opposite direction, and when both of said actuating means are actuated both of said chambers are supplied with fluid under control pressure whereby said valve element is fluid locked in position.

4. Means for remotely controlling the direction and speed of a fluid motor having a pair of ports through which supply and return fluid are adapted to pass, the direction of flow through a given port at a given time depending upon the direction in which the motor is being operated, comprising: a pump adapted to supply fluid under pressure; a fluid reservoir; four-way valve means interconnecting said motor, reservoir and pump, and including a housing having a valve bore therein, a movable valve element in said bore, springs for normally centering said element, and a chamber in said housing at each end of said element adapted to receive fluid under control pressure to move said element in either direction against the force of said centering springs, said valve being arranged so that when said element is in said center position both of said ports are blocked, when said element is moved in one direction from center one of said ports is progressively placed in communication with said pump and the other of said ports with said reservoir, and when said element is moved in the opposite direction from center the other of said ports is progressively placed in communication with said pump and said one port with said reservoir; means for supplying fluid under control pressure; a first pilot valve including a valve bore having a valve spool therein and means urging said spool to a first position; first actuating means for moving said spool from said first position to a second position; a second pilot valve including a valve bore having a valve spool therein and means urging said spool to a first position; second actuating means for moving said second valve spool from said first position to a second position; supply passageways for communicating fluid under control pressure to the bores of said first and second pilot valves; check valves in said supply passageways for preventing flow through said supply passageways from said bores, said pilot valves being so arranged that when neither of said actuating means are actuated and said spools are in said first position each of said chambers communicates with said reservoir whereby said valve element will be centered by said centering springs, when said first actuating means is actuated one of said chambers is supplied with fluid under control pressure and the other chamber is placed in restricted communication with said reservoir whereby said valve element will be forced slowly in one direction, when said second actuating means is actuated the other of said chambers is supplied with fluid under control pressure and said one chamber is placed in restricted communication with said reservoir whereby said valve element will be forced slowly in the opposite direction, and when both of said actuating means are actuated both of said chambers are supplied with fluid under control pressure whereby said valve element is fluid-locked in position.

5. Means for remotely throttling a flow of fluid, comprising: a pump adapted to supply fluid under pressure; a fluid reservoir; throttling valve means communicating with said reservoir and pump, and including a housing having a valve bore therein, a discharge port communicating with said bore, a movable valve element in said bore, springs for normally positioning said element in a first position, and a chamber in said housing at each end of said element adapted to receive fluid under control pressure to move said element back and forth between said first position and a second position, said valve being arranged so that when said element is in said first position said port is blocked, and when said element is moved progressively toward said second position said port is placed in progressively increasing communication with said pump; means for supplying fluid under control pressure; a first pilot valve including a valve bore having a valve spool therein and means urging said spool to a first position; first actuating means for moving said spool from said first position to a second position; a second pilot valve including a valve bore having a valve spool therein and means urging said spool to a first position; second actuating means for moving said second valve spool from said first position to a second position; supply passageways for communicating fluid under control pressure to the bores of said first and second pilot valves; check valves in said supply passageways for preventing flow through said supply passageways from said bores; a first passageway extending from said first valve bore to said second valve bore and thence to said reservoir; a second passageway having flow restricting means therein extending to said reservoir from a point in said first passageway between said bores; a third passageway extending from said second valve bore to said first valve bore and thence to said reservoir; a fourth passageway having flow-restricting means therein extending to said reservoir from a point in said third passageway between said bores; a fifth passageway extending between one of said chambers and said one bore; a sixth passageway extending between the other of said chambers and said other bore; and lands on said pilot valve spools so arranged with respect to the passageways communicating with the respective pilot valve bores that when neither of said actuating means are actuated and said spools are in said first position each of said chambers communicating with said reservoir whereby said valve element will be centered by said centering springs, when said first actuating means is actuated one of said chambers is supplied with fluid under control pressure and the other chamber is placed in communication with said reservoir through said fourth passageway having said flow-restricting means therein whereby said valve element will be forced slowly in one direction, when said second actuating means is actuated the other of said chambers is supplied with fluid under control pressure and said one chamber is placed in communication with said reservoir through said second passageway having flow-restricting means therein whereby said valve element will be forced slowly in the opposite direction, and when both of said actuating means are actuated both of said chambers are supplied with fluid under control pressure whereby said valve element is fluid locked in position.

6. Means for remotely controlling the direction and speed of a fluid motor having a pair of ports through which supply and return fluid are adapted to pass, the direction of flow through a given port at a given time depending upon the direction in which the motor is being operated, comprising: a pump adapted to supply fluid under pressure; a fluid reservoir; four-way valve means interconnecting said motor, reservoir and pump, and including a housing having a valve bore therein, a movable valve element in said bore, springs for normally centering said element, and a chamber in said housing at each end of said element adapted to receive fluid under control pressure to move said element in either direction against the force of said centering springs, said valve being arranged so that when said element is in said centered position both of said ports are blocked, when said element is moved in one direction from center one of said ports is progressively placed in communication with said pump and the other of said ports with said reservoir, and when said element is moved in the opposite direction from center the other of said ports is progressively placed in communication with said pump and said one port with said reservoir; means for supplying fluid under control pressure; a first pilot valve including a valve bore having a valve spool therein and means urging said spool to a first position; a first solenoid for moving said spool from said first position to a second position; a second pilot valve including a valve bore having a valve spool therein and means urging said spool to a first position; a second solenoid for moving said second valve spool from said first position to a second position; supply passageways for communicating fluid under control pressure to the bores of said first and second pilot valves; check valves in said supply passageways for preventing flow through said supply passageways from said bores; a first passageway extending from said first valve bore to said second valve bore and thence to said reservoir; a second passageway having flow-restricting means therein extending to said reservoir from a point in said first passageway between said bores; a third passageway extending from said second valve bore to said first valve bore and thence to said reservoir; a fourth passageway having flow-restricting means therein extending to said reservoir from a point in said third passageway between said bores; a fifth passageway extending between one of said chambers and said one bore; a sixth passageway extending between the other of said chambers and said other bore; and lands on said pilot valve spools so arranged with respect to the passageways communicating with the respective pilot valve bores that when both of said solenoids are deenergized and said spools are in said first position each of said chambers communicates through both valve bores with said reservoir whereby said valve element will be centered by said centering springs, when said first solenoid is energized one of said chambers is supplied with fluid under control pressure and the other chamber is placed in communication with said reservoir through said fourth passageway having said flow-restricting means therein whereby said valve element will be forced slowly in one direction, when said second solenoid is energized the other of said chambers is supplied with fluid under control pressure and said one chamber is placed in communication with said reservoir through said second passageway having flow-restricting means therein whereby said valve element will be forced slowly in the opposite direction, and when both of said solenoids are energized both of said chambers are supplied with fluid under control pressure whereby said valve element is fluid-locked in position.

References Cited in the file of this patent

UNITED STATES PATENTS

| | | |
|---|---|---|
| 1,943,061 | Douglas | Jan. 9, 1934 |
| 2,307,544 | Robinson | Jan. 5, 1943 |
| 2,500,933 | Dailey | Mar. 21, 1950 |